United States Patent [19]

Kaijou

[11] Patent Number: 5,651,921

[45] Date of Patent: *Jul. 29, 1997

[54] PROCESS FOR PREPARING A WATER REPELLENT SILICA SOL

[75] Inventor: Akira Kaijou, Sodegaura, Japan

[73] Assignee: Idemitsu Kosan Company Limited, Tokyo, Japan

[*] Notice: The term of this patent shall not extend beyond the expiration date of Pat. No. 5,431,852.

[21] Appl. No.: 282,158

[22] Filed: Jul. 28, 1994

Related U.S. Application Data

[63] Continuation of Ser. No. 746,906, Aug. 19, 1991, abandoned.

[30] Foreign Application Priority Data

Aug. 27, 1990 [JP] Japan ............................... 2-224818

[51] Int. Cl.$^6$ .................. B01J 13/00; C07F 7/08
[52] U.S. Cl. .................. 252/309; 556/458; 252/314; 106/287.34
[58] Field of Search .................. 252/308, 309, 252/313.2, 315.2; 556/400, 450, 458

[56] References Cited

U.S. PATENT DOCUMENTS

| | | | |
|---|---|---|---|
| 2,567,316 | 9/1951 | Bidaud | 106/287 OR |
| 2,574,902 | 11/1951 | Bechtold et al. | 252/313.2 |
| 2,786,042 | 3/1957 | Iler | 252/309 X |
| 2,801,185 | 7/1957 | Iler | 252/309 X |
| 2,802,850 | 8/1957 | Wetzel | 252/309 X |
| 2,886,460 | 5/1959 | Alexander et al. | 252/309 X |
| 3,600,326 | 8/1971 | Wilcox et al. | 252/309 OR |
| 3,634,288 | 1/1972 | Youngs | 252/358 OR |
| 3,652,329 | 3/1972 | Vossos | 252/309 |
| 4,177,315 | 12/1979 | Ubersax | 428/336 |
| 4,418,165 | 11/1983 | Polmanteer et al. | 523/210 |
| 4,644,077 | 2/1987 | Gupta | 556/457 OR |
| 5,001,183 | 3/1991 | Sands et al. | 524/493 OR |
| 5,185,037 | 2/1993 | Kaijou | 252/313.2 |
| 5,236,623 | 8/1993 | Chevallier | 252/313.2 |
| 5,431,852 | 7/1995 | Kaijou | 252/312 |

FOREIGN PATENT DOCUMENTS

| | | |
|---|---|---|
| 0216047 | 4/1987 | European Pat. Off. . |
| 58-145614 | 8/1983 | Japan . |
| 2-1090 | 1/1990 | Japan . |
| 2056995 | 3/1981 | United Kingdom . |

OTHER PUBLICATIONS

Patent Abstracts of Japan, J58–145614, vol. 53C, #196, Aug. 30, 1983.

Derwent Abstract, AN 83–780575/40 (corresponding to J90–001090–B) (1983).

*Primary Examiner*—Richard D. Lovering
*Assistant Examiner*—Daniel S. Metzmaier
*Attorney, Agent, or Firm*—Frishauf, Holtz, Goodman, Langer & Chick, P.C.

[57] ABSTRACT

A water repellent silica sol comprises colloidal silica particles of a size of 100 nm or less whose surfaces have been made water-repellent by an organic group-substituted silane. The water repellent silica sol is produced by a process which comprises reacting a silica colloid dispersed in a non-polar organic solvent with an organic group-substituted silane so that the surfaces of the colloidal silica particles are made water-repellent by the organic group-substituted silane. Alternatively, the water repellent silicate sol is prepared by a process which comprises adding a non-polar organic solvent, a cationic surface active agent and an organic group-substituted silane to a water-dispersed silica colloid, forming an emulsion therefrom, removing water from the emulsion by azeotropic dehydration and refluxing the emulsion under heating.

20 Claims, No Drawings

PROCESS FOR PREPARING A WATER REPELLENT SILICA SOL

This application is a Continuation of application Ser. No. 07/746,906, filed Aug. 19, 1991, now abandoned.

BACKGROUND OF THE INVENTION

1. Field of the Invention

The present invention relates to a water repellent silica sol and a process for preparing such a sol.

2. Description of Prior Art

Water repellent silica is known as a reinforcer for elastomers, plastics, waxes, etc., or as a thickening agent or viscosity modifier for liquid resins, paints and the like. The conventional water repellent silica powders, however, were incapable of being homogeneously dispersed in non-polar organic solvents such as toluene, and it was necessary to body the silica solution when mixing it with a resin or other material. Thus, there has been increasing call for a water repellent silica which can be dispersed homogeneously in non-polar organic solvents.

Various methods have been proposed for the production of water repellent silica, and these methods can be roughly classified into dry processes and wet processes.

Among the dry processes is, for example, a method which comprises reacting silica with vapor of an organosilicon halide compound at a high temperature (U.S. Pat. No. 2,801,185). This method requires a treatment for perfectly removing water from hygroscopic silica, and therefore it is necessary to perform a complicated treatment such as high-temperature treatment, vacuum deaeration treatment, etc., for effecting perfect removal of water from silica. Also, silica obtained according to this method is large in particle size and has difficulty in being dispersed in non-polar organic solvents.

The wet processes include a method which comprises mixing an alkyltrialkoxysilane with water and if necessary an acid, and adding the mixture to a silica aquasol to perform preliminary hydrolysis of the alkyltrialkoxysilane and subsequent reaction of the preliminarily hydrolyzed alkyltrialkoxysilane with the silica aquasol (U.S. Pat. No. 4,177,315). According to this method, since the reaction is carried out in the presence of a large quantity of water, the alkyltrialkoxysilane used as a reactant is liable to undergo self-condensation therebetween rather than to react with the silica particle surfaces, so that the loss of the reactant is too great and the desired water repellency can not be obtained. Further, the obtained silica particles are large in size and hard to disperse in non-polar organic solvents.

An another wet process, there is known a method which comprises reacting silica with an alkylhalosilane in an alcohol (Japanese Patent Publication No. 1090/1990). In this method, since the reactant alkylhalosilane is reacted not only with silica but also with an alcohol, the loss of the reactant is great and the desired water repellency is hardly obtainable. Also, the obtained silica particles are large in size—around 200 nm—and hard to disperse in non-polar organic solvents.

SUMMARY OF THE INVENTION

The present invention has been made for eliminating said defects of the prior art, and the first object of the invention is to provide a water repellent silica sol having advantages that the silica particles having the water-repellent surfaces are small in size, and they are dispersable in non-polar organic solvents.

The second object of the present invention is to provide a process which is capable of producing said water repellent silica sol at high efficiency with minimizing the loss of the reactant for making the silica particles water-repellent.

The first object stated above could be achieved by a water repellent silica sol of this invention which comprises the colloidal silica particles whose surfaces have been made water-repellent with a silane substituted with at least one organic groups, said colloidal silica particles having the water repellent surfaces being 100 nm or below in size.

The second object set forth above could be achieved by a process of this invention for producing a water repellent silica sol which comprises reacting silica colloid dispersed in a non-polar organic solvent with a silane substituted with at least one organic groups so that the surfaces of the colloidal silica particles are made water-repellent with said silane. This process is hereinafter referred to as process (I).

Said second object could also be achieved by a process of this invention for producing a water repellent silica sol which comprises adding a non-polar organic solvent, a cationic surface active agent and a silane substituted with at least one organic groups to water-dispersed silica colloid, emulsifying them, removing water from the emulsion by azeotropic dehydration and refluxing the residual emulsion under heating. This process is hereinafter referred to as process (II).

First, the water repellent silica sol according to the present invention is described.

The water repellent silica sol of this invention comprises the colloidal silica particles whose surfaces have been made water-repellent with a silane substituted with at least one organic groups (said silane being hereinafter referred to as "organic group-substituted silane"). The organic group-substituted silanes usable in this invention for making the silica particle surfaces water-repellent include the organic group-substituted halosilanes such as methyltrichlorosilane, dimethyldichlorosilane, trimethylchlorosilane, ethyltrichlorosilane, diethyldichlorosilane, triethylchlorosilane, vinyltrichlorosilane, stearyltrichlorosilane, dihexyldichlorosilane, diphenyldichlorosilane, triphenylchlorosilane, n-amyltrichlorosilane, octadecyltrichlorosilane, octadecylmethyldichlorosilane and octadecyldimethylchlorosilane; organic group-substituted alkoxysilanes such as dimethyldimethoxysilane, dimethyldiethoxysilane, diethyldimethoxysilane, diethyldiethoxysilane, octadecylmethyldimethoxysilane, octadecylmethyldiethoxysilane, diallyldimethoxysilane, diallyldiethoxysilane, butenylmethyldimethoxysilane, butenylmethyldiethoxysilane, phenylmethyldimethoxysilane, phenylmethyldiethoxysilane, heptadecafluorodecylmethyldimethoxysilane, heptadecafluorodecylmethyldiethoxysilane, methyltrimethoxysilane, methyltriethoxysilane, vinyltrimethoxysilane, n-amyltriethoxysilane, benzyltrimethoxysilane, octadecyltrimethoxysilane, octadecylmethyldimethoxysilane and octadecyldimethylmethoxysilane; organic group-substituted silazanes such as hexamethyldisilazane; and hydroxysilanes obtained by hydrolyzing said compounds.

Rendering the colloidal silica particle surfaces water-repellent in the preparation of the water repellent silica sol according to this invention can be accomplished in the following way. The hydroxyl groups (—OH) in the colloidal silica particle surfaces are reacted with said organic group-substituted silane to cause bonding of water repellent alkylsilyl groups (—Si—R) to the colloidal silica particle surfaces, thereby forming —O—Si—R groups in said particle surfaces. A hydrophobic nature-imparting ratio (hereafter "hydrophobic ratio") which is a measure of water repellency, is given by the following formula:

$$\frac{N_{RSi}}{N_{OH}} \times 100$$

wherein $N_{OH}$ is the total number of hydroxyl groups in the colloidal silica particle surfaces and $N_{RSi}$ is the number of the alkylsilyl groups bonded to the hydroxyl groups in the colloidal silica particle surfaces.

The hydrophobic ratio defined above is preferably 1 to 100%. If it is less than 1%, there can not be obtained the desired water repellency. In the present invention, said hydrophobic ratio is more preferably 10 to 100%, most preferably 20 to 100%.

As the —O—Si—R groups capable of producing a water-repellent effect are formed in the colloidal silica particle surfaces as described above, the silica sol provided according to this invention has excellent water repellency and finds advantageous application as waterproofing agents.

The water repellent silica sol of this invention is distinguished from the conventional ones in that the colloidal silica particles with the water repellent surfaces are very small in size, which is 100 nm or below. Owing to such a small particle size, the silica sol of this invention can be uniformly dispersed in non-polar organic solvents and also stays very stable after dispersion, so that it may be added to a resin, paint, etc., to prepare an excellent coating material for surface treatment.

As described above, the water repellent silica sol of this invention comprises the colloidal silica particles having their surfaces made water-repellent with an organic group-substituted silane such as mentioned above, said silica particles being dispersed in a polar organic solvent and/or a non-polar organic solvent. As the polar organic solvent, there can be used, for instance, methanol, ethanol, propanol, isopropanol and the like. The polar organic solvent is not limited to those mentioned above. As the non-polar organic solvent, there can be used hydrocarbons such as benzene, toluene, xylene, ethylbenzene, cumene, cyclohexane, ethylcyclohexane, decalin, pentane, heptane and octane. The hydrocarbons further include industrial gasoline such as mineral spirit; petroleum solvents such as kerosene; petrochemical solvents, and mixtures thereof. The non-polar organic solvent is not limited to those mentioned above.

The silica concentration in the water repellent silica sol of this invention using said type of organic solvent as medium is preferably in the range of 0.1 to 80 wt %, more preferably 1 to 80 wt %.

The process (I) of this invention for producing said water repellent silica sol is described below.

The process (I) of this invention is characterized by reacting the silica colloid dispersed in a non-polar organic solvent with an organic group-substituted silane to make the colloidal silica particle surfaces water-repellent with said silane. The silica colloid dispersed in a non-polar organic solvent, which is used as starting material in the above reaction, can be obtained, for example, by the following methods.

Method (a):

To a water-dispersed silica colloid is added a pH adjuster to adjust its pH to 1–5. Then a non-polar organic solvent and a surface active agent are added to the pH-adjusted water-dispersed silica colloid to form an emulsion and this emulsion is subjected to azeotropic dehydration to thereby obtain a silica colloid dispersed in a non-polar organic solvent.

Method (b):

A non-polar organic solvent is added to an alcohol-dispersed silica sol and then the sol is subjected to solvent substitution to thereby obtain a silica colloid dispersed in a non-polar organic solvent.

Regarding the method (a), the water-dispersed silica colloid used in this method is not specifically defined; any of the silica colloids obtainable from such method as acid decomposition electrodialysis using water glass, peptization, ion exchange, and hydrolysis using ethyl silicate can be favorably used.

This water-dispersed silica colloid is adjusted to a pH of 1–5 by adding a pH adjustor. As the pH adjustor, there can be used either an inorganic acid such as sulfuric acid, nitric acid and hydrochloric acid or an organic acid such as acetic acid, but it is preferred to use sulfuric acid in case the silica sol of this invention is intended to be used for surface treatment of concrete. The pH adjustor is used in an amount of 0.005 to 0.10 g per 1 g of silica ($SiO_2$).

The pH-adjusted water-dispersed silica colloid is added with a non-polar organic solvent and a surface active agent and turned into an emulsion. As the non-polar organic solvent, there can be used hydrocarbons such as benzene, toluene, xylene, ethylbenzene, cumene, cyclohexane, ethylcyclohexane, decalin, pentane, heptane and octane; industrial gasolines such as mineral spirit; petroleum solvents such as kerosine; petrochemical solvents, and mixtures thereof. The non-polar organic solvent is preferably used in an amount of 3–30 g per 1 g of water in the water-dispersed silica colloid. As the active surface agent, there can be used anionic surface active agents, cationic surface active agents and nonionic surface active agents such as ether type nonionic surface active agents, ether-ester type nonionic surface active agents, ester type nonionic surface active agents, block polymer type nonionic surface active agents and nitrogen-containing type nonionic surface active agents. The surface active agent is preferably added in an amount of 0.01–1 g per 1 g of silica in the silica colloid. Emulsification can be accomplished by high-speed stirring using a homogenizer or the like.

The emulsion is subjected to azeotropic dehydration in the usual way to obtain a silica colloid dispersed in a non-polar organic solvent.

Another method, or method (b), for obtaining a silica colloid dispersed in a non-polar organic solvent is here explained. As the alcohol-dispersed silica sol used in this method (b), it is possible to use, in the form as it is, a commercially available alcohol-dispersed silica sol (especially one using a lower alcohol such as methanol, ethanol, isopropanol or the like as dispersing medium and having an $SiO_2$ concentration of 20 wt % or above and a pH of 1–5 is preferred). It is also possible to use an alcohol-dispersed silica sol obtained by adding a pH adjuster such as an inorganic acid or an organic acid to a water-dispersed silica colloid to adjust its pH to 1–5; adding a lower alcohol such as methanol, ethanol, propanol, isopropanol or the like to the pH-adjusted water-dispersed silica colloid in a ratio of 10–50 g of the alcohol to 1 g of water in the water-dispersed silica colloid; and then subjecting said silica colloid to azeotropic dehydration in the usual way.

This alcohol-dispersed silica sol, after addition of a non-polar organic solvent, is further subjected to solvent substitution by suitable means such as azeotropic distillation to obtain a silica colloid dispersed in a non-polar organic solvent.

In the process (I) of this invention, the silica sol dispersed in a non-polar organic solvent, which was obtained by the method (a) or method (b) described above, is then reacted with an organic group-substituted silane. As the organic group-substituted silane applied as reactant in said reaction, there can be used, as already mentioned above, organic group-substituted halosilanes such as methyltrichlorosilane, dimethyldichlorosilane, trimethylchlorosilane, ethyltrichlorosilane, diethyldichlorosilane, triethylchlorosilane, vinyltrichlorosilane, stearyltrichlorosilane, dihexyldichlorosilane, diphenyldichlorosilane, triphenylchlorosilane and n-amyltrichlorosilane; organic group-substituted alkoxysilanes such as dimethyldimethoxysilane, dimethyldiethoxysilane, diethyldimethoxysilane, diethyldiethoxysilane, octadecylmethyldimethoxysilane, octadecyltrimethoxysilane, octadecyltriethoxysilane, octadecylmethyldiethoxysilane, diallyldimethoxysilane, diallyldiethoxysilane, butenylmethyldimethoxysilane, butenylmethyldiethoxysilane, phenylmethyldimethoxysilane, phenylmethyldiethoxysilane, heptadecafluorodecylmethyldimethoxysilane, heptadecafluorodecylmethyldiethoxysilane, methyltrimethoxysilane, methyltriethoxysilane, vinyltrimethoxysilane, n-amyltriethoxysilane and benzyltrimethoxysilane; organic group-substituted silazanes such as hexamethyldisilazane; and hydroxysilanes obtainable by hydrolyzing said compounds.

The reaction of the silica colloid and the organic group-substituted silane is preferably carried out with reflux under heating by setting the reaction temperature at the boiling point of the non-polar organic solvent used. The time for reflux under heating is usually 1–8 hours. This reflux under heating causes the hydroxyl groups (—OH) in the colloidal silica particle surfaces to react with said organic group-substituted silane, with the result that the water repellent alkylsilyl groups (—Si—R) are bonded to the silica particle surfaces to form the —O—Si—R groups, thereby making the colloidal silica particle surfaces water-repellent.

Therefore, the water repellent silica sol obtained according to the process (I) of this invention has excellent water repellency and can be used advantageously as a waterproofing agent. The hydrophobic ratio is preferably 1–100%, more preferably 10–100%, most preferably 20–100%.

It is to be noted that the process (I) of this invention, unlike the conventional water repellent silica sol preparation processes, enables obtainment of a water repellent silica sol of which the constituent colloidal silica particles having the water repellent surfaces are very small in size, which is 100 nm or below. Further, this water repellent silica sol can be dispersed uniformly in non-polar organic solvents, so that it may be properly added to a resin, paint or the like to provide an excellent coating material for surface treatment.

In the above-described preparation of a water repellent silica sol according to the process (I) of this invention, a non-polar organic solvent is used as dispersing medium. When it is desired to obtain a water repellent silica sol dispersed in a polar organic solvent as a dispersing medium, the following treatment is conducted on said water repellent silica sol prepared by using a non-polar organic solvent as a dispersing medium. That is, said water repellent silica sol is heated to let the non-polar organic solvent evaporate away and then a polar organic solvent is added to obtain a desired water repellent silica sol dispersed in a polar organic solvent as dispersing medium.

For obtaining a water repellent silica sol where the dispersing medium is a mixture of a non-polar organic solvent and a polar organic solvent, a polar organic solvent such as methanol, ethanol, propanol, isopropanol or the like is added to a water repellent silica sol dispersed in a non-polar organic solvent as a dispersing medium.

Now, the process (II) of this invention for preparing a water repellent silica sol is explained.

In the process (II) of this invention, first a non-polar organic solvent, a cationic surface active agent and an organic group-substituted silane are added to a water-dispersed silica colloid to form an emulsion.

The water-dispersed silica colloid used in this process is not specified; it is possible to employ the same water-dispersed silica colloid as used in the above-described process (I) (such as one prepared according to such method as acid decomposition electrodialysis using water glass, peptization, ion exchange, and hydrolysis using ethyl silicate). The silica concentration in the water-dispersed silica colloid should be 0.1–50 wt %, preferably 1–50 wt %.

As the non-polar organic solvent added to said water-dispersed silica colloid in the process (II), there can be used the same as employed in the above-described process (I), namely hydrocarbons such as benzene, toluene, xylene, ethylbenzene, cumene, cyclohexane, ethylcyclohexane, decalin, pentane, heptane and octane. The hydrocarbons further include industrial gasoline such as mineral spirit; petroleum solvents such as kerosine; petrochemical solvents, and mixtures of these solvents. The non-polar organic solvent is preferably added in an amount of 3–30 g per 1 g of water in the water-dispersed silica colloid.

As the surface active agent added to the water-dispersed silica colloid in the process (II), there is used a cationic surface active agent for the following reason. When an organic solvent is mixed in a water-dispersed silica colloid, stability of dispersion is maintained by usually setting pH on the acid side, but when a cationic surface active agent is used, dispersion stability is maintained even if pH is not set on the acid side. This is because of the fact that when a cationic surface active agent is added to the colloidal silica particles which are negatively charged, the positively charged particles of the cationic surface active agent surround the negatively charged colloidal silica particles to prevent cohesion or coagulation of the colloidal silica particles.

As the cationic surface active agent, there can be used, for instance, alkylamine salts, polyamine fatty acid derivatives, amino-alcohol fatty acid derivatives, quaternary alkylammonium salts (such as alkyltrimethylammonium salt), cyclic quaternary ammonium salts (such as alkylpyridinium salt), quaternary ammonium salts having hydroxyl group(s), quaternary ammonium salts having ether linkage(s), quaternary ammonium salts having amide linkage(s), and the like. The cationic surface active agent is not limited thereto. The amount of the cationic surface active agent added should be in the range of 0.001–10 g, preferably 0.005–2 g, more preferably 0.01–10 g, per 1 g of silica in the silica colloid.

As the organic group-substituted silane added to the silica colloid, there can be used, for instance, organic group-substituted halosilanes (such as octadecyltrichlorosilane, octadecylmethyldichlorosilane and octadecyldimethylchlorosilane), organic group-substituted alkoxysilanes (such as octadecyltrimethoxysilane, octadecylmethyldimethoxysilane and octadecyldimethylmethoxysilane), organic group-substituted silazanes, and hydroxysilanes obtained by hydrolyzing these silanes or silazanes. Among them, those having a long-chain alkyl group of 8–25 carbon atoms such as octadecyl group mentioned above are preferred because of long-time retention of water repellency. The amount of the organic group-substituted silane added to the silica colloid in the above process should be 0.01–1 g, preferably 0.1–1 g per 1 g of silica in the silica colloid.

Emulsification of the silica colloid after addition of a non-polar organic solvent, a cationic surface active agent and an organic group-substituted silane can be accomplished by high-speed stirring using a homogenizer or other suitable means.

According to the process (II) of this invention, water is removed from the emulsion by means of azeotropic dehydration. This azeotropic dehydration is performed by using the ordinary azeotropic dehydrating distillation techniques, and the azeotropic dehydration time is usually 0.1–5 hours. When a solvent having a boiling point above 150° C. such as mesitylene, butylbenzene, p-cymene, diethylbenzene, etc., is used as non-polar organic solvent, it is necessary to perfectly remove water by vacuum distillation or reflux dehydration after azeotropic dehydration.

According to the process (II) of the present invention, the mixed solution cleared of water by azeotropic dehydration is then refluxed under heating. This reflux under heating is conducted at the boiling point of the non-polar organic solvent used. The reflux time is usually 0.1–8 hours. This reflux under heating causes the hydroxyl groups (—OH) in the colloidal silica particle surfaces to react with said organic group-substituted silane to form the water repellent groups in the silica particle surfaces, whereby the surfaces of the colloidal silica particles are made water-repellent.

Thus, the water repellent silica sol obtained according to the process (II) of this invention has excellent water repellency and can be favorably used as a waterproofing agent.

The hydrophobic ratio, which is a measure of water repellency, is preferably 1–100%, more preferably 10–100%, most preferably 20–100%.

The silica concentration in the water repellent silica sol according to this invention is 0.1–80 wt %, preferably 1–80 wt %.

According to the process (II) of this invention, unlike the conventional processes, there can be obtained a water repellent silica sol in which the constituent colloidal silica particles having the water repellent surfaces are very small in size, which is 100 nm or below. This water repellent silica sol can be dispersed uniformly in non-polar organic solvents and maintains very high stability after dispersion, so that it may be added to an appropriate resin, paint or the like to provide an excellent coating material for surface treatment.

In the preparation of a water repellent silica sol according to the process (II) of this invention, a non-polar organic solvent is used as a dispersing medium. For obtaining a water repellent silica sol dispersed in a polar organic solvent as a dispersing medium, the following treatment is performed on the water repellent silica sol dispersed in a non-polar organic solvent as dispersing medium. That is, the water repellent silica sol dispersed in a non-polar organic solvent as a dispersing medium is heated to evaporate away the non-polar organic solvent, and then-a polar organic solvent is added to the silica sol. When it is desired to obtain a water repellent silica sol dispersed in a mixture of a non-polar organic solvent and a polar organic solvent as a dispersing medium, a polar organic solvent such as methanol, ethanol, propanol, isopropanol or the like is added to the water repellent silica sol dispersed in a non-polar organic solvent as a dispersing medium.

EXAMPLES

The present invention will be further described below with reference to the examples thereof.

EXAMPLE 1

Preparation of a water repellent silica sol according to the process (I)

To 50 g of a commercially available water-dispersed silica colloid (S-20L produced by Shokubai Kasei KK, $SiO_2$ concentration: 20%), 0.1 g of concentrated sulfuric acid was added dropwise and mixed to adjust the pH of the colloid to 3. To this solution were added 0.1 g of polyethylene glycol monocetyl ether and 370 g of n-heptane, and the solution was stirred and mixed for 10 minutes by a homogenizer to prepare an emulsion. This emulsion was put into 1-liter three-necked flask equipped with a stirrer and a distillation equipment and subjected to azeotropic dehydration with continuous stirring. Distillation was stopped at the moment when the boiling point (98.4° C.) of n-heptane was reached, thereby obtaining an n-heptane-dispersed silica sol solution. The water content of the solution measured at this point was 0.5 wt %.

To this solution was added 6.5 g of the reactant octadecylmethyldimethoxysilane, followed by reflux under heating with continuous stirring for 4 hours, to cause the reaction of the hydroxyl groups in the silica particle surfaces with said reactant, whereby 150 g of a water repellent silica sol was obtained. The $SiO_2$ concentration of the thus obtained water repellent silica sol was 6.7 wt %, and the hydrophobic ratio was 95%. The silica particle size measured by the light scattering method was 40 nm. One gram of this water repellent silica sol was applied on a JIS 1–3 mortar plate and 0.03 cc of water was dropped onto said mortar plate after the sol coating was dried. The mortar plate repelled water, indicating excellent water repellency of said silica sol.

In another test, 1 g of said water repellent silica sol was applied on a JIS 1–3 mortar plate and, after one-day drying at normal temperature, one drop (0.03 cc) of water was let fall onto said mortar plate by a dropping pipette and the diameter of the water droplet on the mortar plate was measured. It was 5.2 mm. This result also confirmed excellent water repellency of said silica sol. By way of comparison, one drop (0.03 cc) of water was let fall by a dropping pipette onto a JIS 1–3 mortar plate to which said water repellent silica sol had not been applied, and the diameter of the water droplet on the mortar plate was measured. It was 12.2 mm.

Further, said water repellent silica sol was placed in a 100 cc sample bottle and allowed to stand at normal temperature for 30 days, during which period the change of silica particle size with time was traced by the light scattering method. As a result, the silica particle size after the lapse of 30 days was 42 nm, not much different from that (40 nm) at the time of preparation, from which lasting stability of said water repellent silica sol was confirmed.

EXAMPLE 2

Preparation of water repellent silica sol according to the process (I)

To 33.3 g of a commercially available isopropyl alcohol-dispersed silica colloid (OSCAL 1432 produced by Shokubai Kasei KK, $SiO_2$ concentration: 30%), 300 g of toluene was added and solvent substitution was performed by azeotropic distillation. Distillation was stopped upon reaching the boiling point (110° C.) of toluene to obtain a toluene-dispersed silica sol.

To this solution were added 0.8 g of water and 6.5 g of the reactant octadecylmethyldimethoxysilane, and the mixture was refluxed under heating with continuous stirring for 4 hours, letting the hydroxyl groups in the silica particle surfaces react with said reactant to obtain 150 g of a water repellent silica sol. The $SiO_2$ concentration in the thus obtained water repellent silica sol was 6.5 wt %, and the hydrophobic ratio was 97%. The silica particle size measured by the light scattering method was 45 nm. When 1 g of this water repellent silica sol was applied on a JIS 1–3 mortar plate and 0.03 cc of water was dropped onto said mortar plate after sol coating was dried, the mortar plate repelled water, indicating excellent water repellency of said silica sol.

In another test, 1 g of said water repellent silica sol was applied on a JIS 1–3 mortar plate and, after one-day drying at normal temperature, one drop (0.03 cc) of water was let fall onto said mortar plate by using a dropping pipette and the diameter of the water droplet on said mortar plate was measured. It was 5.3 mm. This was indicative of excellent water repellency of said water repellent silica sol.

EXAMPLE 3

Preparation of water repellent silica sol according to the process (I)

To 50 g of a commercially available water-dispersed silica colloid (S-20L produced by Shokubai Kasei KK, $SiO_2$ concentration: 20%), 0.1 g of concentrated sulfuric acid was added dropwise and mixed to adjust pH of the colloid to 3. To this solution was added 300 g of isopropanol, and the mixture was subjected to azeotropic dehydration with continuous stirring. At the point when 200 g was distilled off, 200 g of isopropanol was added and azeotropic distillation was again conducted. The same operation was repeated further two times to obtain 150 g of an isopropanol-dispersed silica sol. To this solution was added 300 g of toluene and solvent substitution was performed by azeotropic distillation. Distillation was stopped upon reaching the boiling point (110° C.) of toluene to obtain a toluene-dispersed silica sol solution. The water content of this solution was 0.4 wt %.

To this solution was added 6.5 g of the reactant octadecylmethyldimethoxysilane, and the mixture was refluxed under heating with continuous stirring for 4 hours to effect reaction of the hydroxyl groups in the silica particle surfaces with said reactant, thereby obtaining 150 g of a water repellent silica sol. The $SiO_2$ concentration in the obtained water repellent silica sol was 6.7 wt %, and the hydrophobic ratio was 96%. The silica particle size measured by the light scattering method was 41 nm. When 1 g of this water repellent silica sol was applied on a JIS 1–3 mortar plate and 0.03 cc of water was dropped onto said mortar plate after sol coating was dried, the mortar plate repelled water, indicating excellent water repellency of said silica sol.

In another test, 1 g of said water repellent silica sol was applied on a JIS 1–3 mortar plate and, after one-day drying at normal temperature, one drop (0.03 cc) of water was let fall on said mortar plate by a dropping pipette and the diameter of the water droplet on the mortar plate was measured. It was 5.0 mm. This result also confirmed excellent water repellency of said silica sol.

EXAMPLE 4

Preparation of water repellent silica sol according to the process (II)

To 50 g of a commercial water-dispersed silica colloid (S-20L produced by Shokubai Kasei KK, $SiO_2$ concentration: 20%) were added 400 g of toluene, 2 g of a commercial cationic surface active agent (Cortamine D86P produced by Kao Corp., concentration of surface active agent: 20%) and 6.5 g of a silylating agent (octadecyltrimethoxysilane), and these materials were mixed up by stirring for 10 minutes by a homogenizer to prepare an emulsion.

This emulsion was placed in a 1-liter three-necked flask equipped with a stirrer, a condenser and a distillation device and was subjected to azeotropic dehydrating distillation for about one hour with continuous stirring while observing the vapor temperature. Distillation was stopped at the moment when the vapor temperature reached the boiling point (110.6° C.) of toluene, and switched to the reflux course. The emulsion was refluxed under heating for 2 hours to obtain 200 g of a toluene-dispersed water repellent silica sol.

The results of analysis of the obtained water repellent silica sol showed that the $SiO_2$ concentration (measured by gravimetric analysis) was 5.0 wt %, the hydrophobic ratio (determined by liquid chromatography) was 97%, the pH was 7.5 and the colloidal particle size (measured by the light scattering method) was 40 nm.

One gram of said water repellent silica sol was applied on a JIS 1–3 mortar plate (100×100×10 mm) and, after one-day drying at normal temperature, one drop (0.03 cc) of water was let fall on said mortar plate by a dropping pipette and the diameter of the water droplet on the mortar plate was measured. It was 5.2 mm. This confirmed excellent water repellency of said silica sol. For comparison's sake, one drop (0.03 cc) of water was similarly let fall on a JIS 1–3 mortar plate to which said water repellent silica sol had not been applied, and the diameter of the water droplet on said mortar plate was measured. It was 12.2 mm.

Further, said water repellent silica sol was placed in a 100 cc sample bottle and allowed to stand at normal temperature for 30 days, during which period the change of silica particle size with time was traced by using the light scattering method. As the result showed, the silica particle size after the lapse of 30 days was 42 nm, which was not much different from that (40 nm) at the time of preparation and confirmed lasting stability of said water repellent silica sol.

Comparative Example 1

An organosilica sol was prepared according to the process of Example 1 of Japanese Patent Publication No. 1090/1990 as described below.

300 g of n-butyl alcohol was added to 33.3 g of a commercially available isopropyl alcohol-dispersed silica colloid (OSCAL 2432 produced by Shokubai Kasei KK, $SiO_2$ concentration: 30%) and the mixture was subjected to azeotropic distillation to effect solvent substitution. Distillation was stopped when the boiling point (117.5° C.) of n-butyl alcohol was reached to obtain an n-butyl alcohol-dispersed silica sol solution.

To this solution was added 6.5 g of octadecyltrimethoxysilane and the mixture was refluxed under heating with continuous stirring for 2 hours to give 200 g of an n-butyl alcohol-dispersed organosilica sol.

The results of analysis of the obtained organosilica sol showed that the $SiO_2$ concentration (measured by gravimetric analysis) was 5.0 wt %, the hydrophobic ratio (determined by liquid chromatography) was 15%, the pH of the sol was 5.1 and the colloidal silica particle size (measured by light scattering method) was 185 nm.

One gram of this organosilica sol was applied on a JIS 1–3 mortar plate and, after one-day drying at normal temperature, one drop (0.03 cc) of water was let fall on said mortar plate by a dropping pipette and the diameter of the water droplet on the mortar plate was measured. It was 8.4 mm. It was confirmed from this result that said organosilica sol had little water repellency.

As described above, the present invention provides a water repellent silica sol which shows a notably high water repellency, can be dispersed in non-polar organic solvents owing to the very small colloidal silica particle size (100 nm or below) and also has excellent dispersion stability. A process for producing such an excellent water repellent silica sol is also provided according to this invention.

What is claimed is:

1. A process for producing a water repellent silica sol which comprises adding a non-polar organic solvent, a cationic surface active agent and an organic group-substituted silane to a water-dispersed silica colloid having particles of a size of 100 nm or below, forming an emulsion therefrom, removing water from the emulsion by azeotropic dehydration and then refluxing the emulsion under heating.

2. The process according to claim 1, wherein the water-dispersed silica colloid is obtained by a method selected from the group consisting of acid decomposition electrodialysis method using water glass, peptization method, ion exchange method, and hydrolysis method using ethyl silicate.

3. The process according to claim 2, wherein the silica is in a concentration in the water-dispersed silica colloid of 0.1–50 wt %; the non-polar organic solvent is added in an amount of 3 to 30 g per 1 g of water in the water-dispersed silica colloid; the cationic surface active agent is selected from the group consisting of alkylamine salts, polyamine fatty acid compounds, aminoalcohol fatty acid compounds, quaternary alkylammonium salts, cyclic quaternary ammonium salts, quaternary ammonium salts having at least one hydroxy group, quaternary ammonium salts having at least one ether linkage and quaternary ammonium salts having at least one amide linkage; the organic group-substituted silane reacted with the silica colloid is selected from the group consisting of organic group-substituted halosilanes, organic group-substituted alkoxysilanes, organic group-substituted silazanes and hydrolyzates thereof; the organic group-substituted silane has long-chain alkyl groups of 8–25 carbon atoms; and the cationic surface active agent is in an amount of 0.001 to 10 g per g of silica in the silica colloid.

4. The process according to claim 1, wherein the silica concentration in the water-dispersed silica colloid is 0.1–50 wt %.

5. The process according to claim 1, wherein the non-polar organic solvent includes hydrocarbons.

6. The process according to claim 1, wherein the non-polar organic solvent is selected from the group consisting of benzene, toluene, xylene, ethylbenzene, cumene, cyclohexane, ethylcyclohexane, decalin, pentane, heptane, octane, industrial gasoline, petroleum solvents, petrochemical solvents and mixtures thereof.

7. The process according to claim 1, wherein the non-polar organic solvent is added in an amount of 3–30 g per 1 g of water in the water-dispersed silica colloid.

8. The process according to claim 1, wherein the cationic surface active agent is selected from the group consisting of alkylamine salts, polyamine fatty acid compounds, aminoalcohol fatty acid compounds, quaternary alkylammonium salts, cyclic quaternary ammonium salts, quaternary ammonium salts having hydroxy group(s), quaternary ammonium salts having ether linkage(s) and quaternary ammonium salts having amide linkage(s).

9. The process according to claim 1, wherein the organic group-substituted silane reacted with the silica colloid is selected from the group consisting of organic group-substituted halosilanes, organic group-substituted alkoxysilanes, organic group-substituted silazanes and hydrolyzates thereof.

10. The process according to claim 1, wherein the organic group-substituted silane has long-chain alkyl groups of 8–25 carbon atoms.

11. A process for producing a water repellent silica sol which comprises (a) producing a silica colloid dispersed in a non-polar organic solvent by adding a non-polar organic solvent and a cationic surface active agent to a water-dispersed silica colloid which has been adjusted to a pH of 1 to 5 by adding a pH adjustor, forming an emulsion therefrom and subjecting the emulsion to an azeotropic dehydration;

(b) reacting the silica colloid dispersed in the non-polar organic solvent with an organic group-substituted silane so that the surfaces of the colloidal silica particles are made water-repellent by said organic group-substituted silane, the colloidal silica particles having a size of 100 nm or below.

12. The process according to claim 11, wherein the water-dispersed silica colloid is obtained by a method selected from the group consisting of acid decomposition electrodialysis method using water glass, peptization method, ion exchange method, and hydrolysis method using ethyl silicate.

13. The process according to claim 12, wherein the organic group-substituted silane reacted with the silica colloid is selected from the group consisting of organic group-substituted halosilanes, organic group-substituted alkoxysilanes, organic group-substituted silazanes and hydrolyzates thereof.

14. The process of claim 13, wherein the organic group-substituted silane is selected from the group consisting of methyltrichlorosilane, dimethyldichlorosilane, trimethylchlorosilane, ethyltrichlorosilane, diethyldichlorosilane, triethylchlorosilane, vinyltrichlorosilane, stearyltrichlorosilane, dihexyldichlorosilane, diphenyldichlorosilane, triphenylchlorosilane, n-amyltrichlorosilane, octadecyltrichlorosilane, octadecylmethyldichlorosilane, octadecyldimethylchlorosilane, dimethyldimethoxysilane, dimethyldiethoxysilane, diethyldimethoxysilane, diethyldiethoxysilane, octadecylmethyldimethoxysilane, octadecymethyldiethoxysilane, diallyldimethoxysilane, diallyldiethoxysilane, butenylmethyldimethoxysilane, butenylmethyldiethoxysilane, phenylmethyldimethoxysilane, phenylmethyldiethoxysilane, heptadecafluorodecylmethyldimethoxysilane, heptadecafluorodecylmethyldiethoxysilane, methyltrimethoxysilane, methyltriethoxysilane, vinyltrimethoxysilane, n-amyltriethoxysilane, benzyltrimethoxysilane, octadecyltrimethoxysilane, octadecylmethyldimethoxysilane, octadecyldimethylmethoxysilane and hexamethyldisilazane; said organic group-substituted silane being added in an amount of 0.01 to 1 g per 1 g of silica in the silica colloid.

15. The process according to claim 11, wherein the silica colloid dispersed in a non-polar organic solvent is obtained by adding a non-polar organic solvent to an alcohol-dispersed silica sol and then performing solvent substitution.

16. The process according to claim 15 wherein the alcohol-dispersed silica sol is obtained by adding a lower alcohol to a water-dispersed silica colloid which has been adjusted to a pH of 1–5 by adding a pH adjustor, and then carrying out azeotropic dehydration.

17. The process according to claim 16, wherein the water-dispersed silica colloid is obtained by a method selected from the group consisting of acid decomposition electrodialysis method using water glass, peptization method, ion exchange method, and hydrolysis method using ethyl silicate.

18. The process according to claim 17, wherein the organic group-substituted silane reacted with the silica colloid is selected from the group consisting of organic group-substituted halosilanes, organic group-substituted alkoxysilanes, organic group-substituted silazanes and hydrolyzates thereof.

19. The process of claim 18, wherein the organic group-substituted silane is selected from the group consisting of methyltrichlorosilane, dimethyldichlorosilane, trimethylchlorosilane, ethyltrichlorosilane, diethyldichlorosilane, triethylchlorosilane, vinyltrichlorosilane, stearyltrichlorosilane, dihexyldichlorosilane, diphenyldichlorosilane, triphenylchlorosilane, n-amyltrichlorosilane, octadecyltrichlorosilane, octadecylmethyldichlorosilane, octadecyldimethylchlorosilane, dimethyldimethoxysilane, dimethyldiethoxysilane, diethyldimethoxysilane, diethyldiethoxysilane, octadecylmethyldimethoxysilane, octadecymethyldiethoxysilane, diallyldimethoxysilane, diallyldiethoxysilane, butenylmethyldimethoxysilane, butenylmethyldiethoxysilane, phenylmethyldimethoxysilane, phenylmethyldiethoxysilane, heptadecafluorodecylmethyldimethoxysilane, heptadecafluorodecylmethyldiethoxysilane, methyltrimethoxysilane, methyltriethoxysilane, vinyltrimethoxysilane, n-amyltriethoxysilane, benzyltrimethoxysilane, octadecyltrimethoxysilane, octadecylmethyldimethoxysilane, octadecyldimethylmethoxysilane and hexamethyldisilazane; said organic group-substituted silane being added in an amount of 0.01 to 1 g per 1 g of silica in the silica colloid.

20. The process according to claim 11, wherein the organic group-substituted silane reacted with the silica colloid is selected from the group consisting of organic group-substituted halosilanes, organic group-substituted alkoxysilanes, organic group-substituted silazanes and hydrolyzates thereof.

* * * * *